(12) United States Patent
Reinhold

(10) Patent No.: US 6,278,205 B1
(45) Date of Patent: Aug. 21, 2001

(54) ELECTRIC MOTOR WITH CONNECTOR ELEMENT ON FOIL-SHAPED INSULATING SUBSTRATE

(75) Inventor: Elferich Reinhold, Aachen (DE)

(73) Assignee: U.S. Philips Corpration, New York, NY (US)

( * ) Notice: Subject to any disclaimer, the term of this patent is extended or adjusted under 35 U.S.C. 154(b) by 0 days.

(21) Appl. No.: 09/619,186

(22) Filed: Jul. 19, 2000

(30) Foreign Application Priority Data

Jul. 20, 1999 (DE) .............................................. 199 33 369
Apr. 25, 2000 (EP) ................................................. 00201476

(51) Int. Cl.⁷ ..................................................... H02K 7/00
(52) U.S. Cl. .......................... 310/67 R; 310/71; 310/179; 310/208; 310/254
(58) Field of Search ..................................... 310/67 R, 71, 310/179, 180, 208, 89, 216, 254, DIG. 6

(56) References Cited

U.S. PATENT DOCUMENTS

| | | | |
|---|---|---|---|
| 4,645,961 | * 2/1987 | Malsky | 310/154 |
| 4,843,269 | * 6/1989 | Shramo | 310/208 |
| 4,962,329 | * 10/1990 | Fujita et al. | 310/208 |
| 5,331,244 | * 7/1994 | Rabe | 310/180 |
| 5,510,663 | * 4/1996 | Van Loenen | 310/179 |

FOREIGN PATENT DOCUMENTS

0764357B1   3/1997   (EP)   ................................ H02K/3/26

* cited by examiner

Primary Examiner—Nestor Ramirez
Assistant Examiner—Thanh Lam

(57) ABSTRACT

An electric motor (19) comprises a first part (21) and a second part (23) which are rotatable with respect to each other about an axis of rotation (9). The first part comprises a foil-shaped insulating substrate (51) on which a plurality of series-connected spiral-shaped patterns (67, 67', 69, 69', 71, 71') of conductor tracks are provided. Said substrate is bent so as to form a circular-cylindrical body (29), which extends, seen in a direction parallel to the axis or rotation, between a first and a second imaginary end surface (59, 61), and which is mounted on a carrier (2) near the first end surface (59). The second part comprises a permanent magnet unit (73) for generating a magnetic field at the location of the conductor tracks. The first part is provided with connector means (79) for connecting the conductor tracks to an electrical energy source.

According to the invention, the connector means (79) comprise a first connector element (91), which is provided on the substrate (51) between the first and the second end surfaces (59, 61) near the first end surface (59), and a second connector element (93), which is provided on the carrier (27) and is electrically connected to the first connector element. In a preferred embodiment, the first connector element comprises a number of additional conductor tracks (95, 97, 99, 101, 103, 105) which are provided on the substrate and extend substantially parallel to the first end surface. Thus, a simple and robust construction of the connector means is provided which is effectively protected against damage, which could be caused by inaccurate handling forces and movements during the manufacturing process of the motor.

An electric motor (19) in accordance with the invention is used in a data storage unit (1) in accordance with the invention.

6 Claims, 5 Drawing Sheets

ELECTRIC MOTOR WITH CONNECTOR ELEMENT ON FOIL-SHAPED INSULATING SUBSTRATE

FIELD OF THE INVENTION

The invention relates to an electric motor comprising a first part and a second part which are rotatable with respect to each other about an axis of rotation, wherein the first part comprises a foil-shaped insulating substrate, on which a plurality of series-connected spiral-shaped patterns of conductor tracks are provided and which is bent as a circular-cylindrical body extending, seen in a direction parallel to the axis of rotation, between a first and a second imaginary end surface and being mounted on a carrier near the first end surface, and wherein the second part comprises a permanent magnet unit for generating a magnetic field at the location of the conductor tracks, said first part being provided with connector means for connecting said conductor tracks to an electrical energy source.

The invention further relates to a data storage unit comprising a support for at least one information carrier, an electric motor for rotating the support about an axis of rotation, and a scanning unit for scanning the information carrier.

DESCRIPTION OF PRIOR ART

A data storage unit and an electric motor of the kinds mentioned in the opening paragraphs are known from EP-B-0 764 357. The known data storage unit is a hard disc drive, wherein a plurality of hard discs are arranged in mutually parallel positions on the rotatable support. The known electric motor, which is used to rotate the support about the axis of rotation, comprises a circular-cylindrical stator body comprising three layers of the foil-shaped insulating substrate. The patterns of conductor tracks form a three-phase electric coil system, wherein each layer of the stator body comprises one of the respective phases. The conductor tracks constitute relatively thin copper tracks, which are provided on the substrate by means of an etching process. The known electric motor further comprises a circular-cylindrical rotor body, which is fastened to the support and comprises a circular-cylindrical permanent magnet and a circular-cylindrical closing yoke, the stator body being arranged in a circular-cylindrical gap which is present between the magnet and the closing yoke. The connector means of the known electric motor comprise two strip-like foil elements for each phase of the coil system, on which foil elements extensions of an initial and an end conductor track of the relevant phase are provided. Said strip-like foil elements extend in an imaginary plane extending through the substrate, and are arranged outside the boundaries of the substrate formed by the first and the second end surface.

A disadvantage of the known data storage unit and the known electric motor used therein is that, during the manufacturing process of the first part of the motor and the manufacturing process of the motor, the strip-like foil elements of the connector means of the motor can easily be bent under the influence of inaccurate handling forces and movements, whereby the complete substrate can be rendered useless for the further manufacturing process. Thus, to avoid an excessive percentage of rejected parts during the manufacturing process, the accuracy of the manufacturing process must be relatively high.

SUMMARY OF THE INVENTION

It is an object of the invention to provide an electric motor and a data storage unit of the kinds mentioned in the opening paragraphs, in which the disadvantage of the known electric motor and the known data storage unit is prevented as much as possible.

To achieve this object, an electric motor in accordance with the invention is characterized in that said connector means comprise a first connector element, which is provided on the substrate between the first and the second end surface near the first end surface and is electrically connected to the conductor tracks, and a second connector element, which is provided on the carrier and is electrically connected to the first connector element.

To achieve this object, a data storage unit in accordance with the invention is characterized in that the electric motor used therein is an electric motor in accordance with the invention.

Since the first connector element is provided on the substrate between the first and the second end surface of the substrate, the first connector element is protected against damage, which could result from inaccurate handling forces and movements during the manufacturing process. The first connector element can be connected to the energy source via the second connector element, which is also effectively protected against damage as a result of its presence on the carrier. In this way, a practical and robust construction of the connector means is achieved.

DETAILED DESCRIPTION OF THE PREFERRED EMBODIMENTS

A particular embodiment of an electric motor in accordance with the invention is characterized in that the first connector element comprises an additional conductor track. The additional conductor track can be provided on the substrate in a similar manner as and simultaneously with the patterns of conductor tracks, for example by means of an etch process. Thus, the manufacturing process of the electric motor is further simplified. Besides, said additional conductor track is substantially not susceptible to damage caused by inaccurate handling forces and movements during the manufacturing process of the motor.

A further embodiment of an electric motor in accordance with the invention is characterized in that the additional conductor track extends substantially parallel to the first end surface. In this further embodiment, a great freedom of design is achieved regarding the position of the second connector element on the carrier, because the length of the additional conductor track can be adapted to the desired position of the second connector element.

Yet another embodiment of an electric motor in accordance with the invention is characterized in that the substrate is provided with a metal track extending near the first end surface, substantially parallel to the first end surface, and substantially over the complete length of the substrate, wherein part of said metal track constitutes the additional conductor track. As a result of the presence of said metal track, a substantially uniform bending stiffness of the substrate is achieved over the complete length of the substrate, so that said circular-cylindrical body of the first part of the motor, which is formed by bending said substrate, has an accurate circular-cylindrical form.

A particular embodiment of an electric motor in accordance with the invention is characterized in that the circular-cylindrical body comprises at least two substrate layers, wherein each layer, which is present between another layer and a connector element on the carrier connected to the other layer, is provided with an opening in the substrate through which said connector element extends. By virtue of said opening in each relevant layer, each layer can be provided with a connector element which is positioned on the substrate between the first and the second end surface of the substrate. Since the connector element on each relevant layer is provided near the first end surface, the opening can be formed as a simple recess in the edge of the substrate which is present near the first end surface.

BRIEF DESCRIPTION OF THE DRAWINGS

Embodiments of the invention will be explained in more detail below with reference to the drawing, in which.

Figure 1:
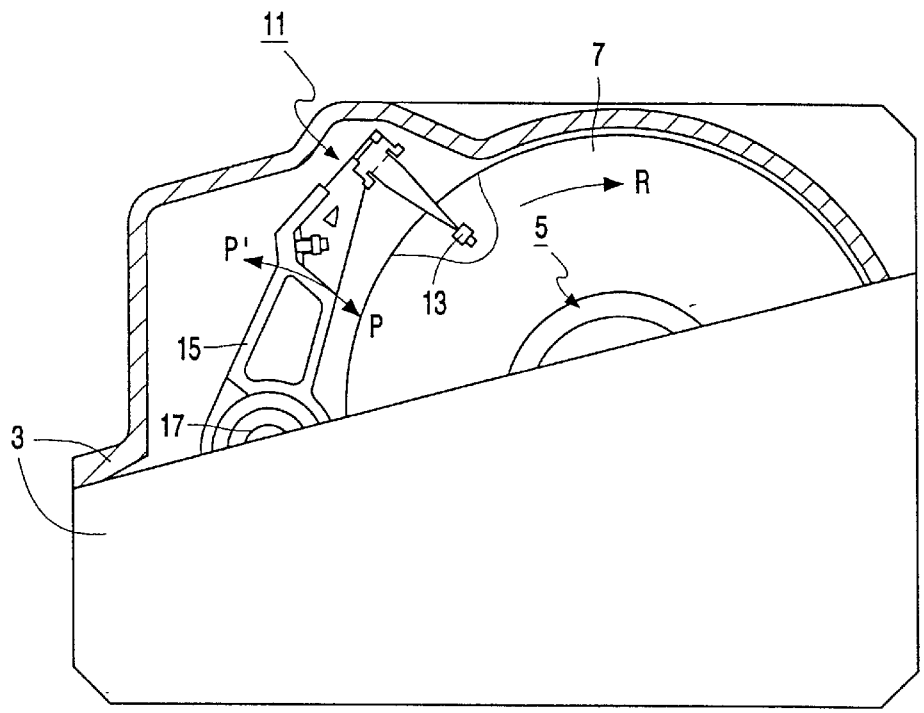
FIG. 1 is a diagrammatic plan view of a data storage unit in accordance with the invention provided with an electric motor in accordance with the invention.
Figure 2:
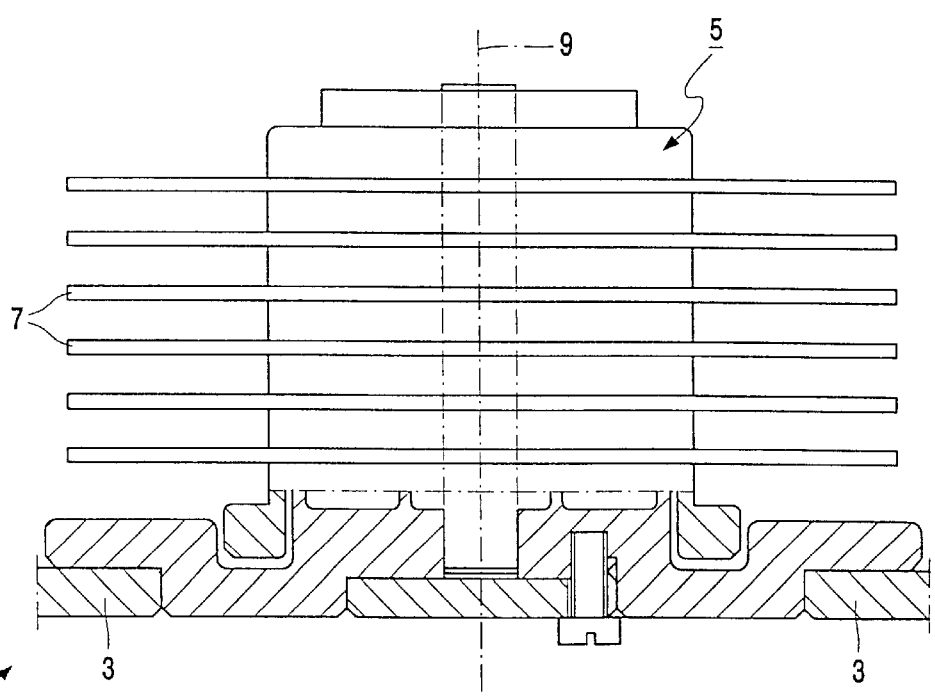
FIG. 2 is a side elevation of the data storage unit of FIG. 1.

A data storage unit 1 in accordance with the invention shown in FIGS. 1 and 2 comprises a housing 3 accommodating a support 5 for a number of information carriers 7. The support 5 is rotatable about an axis of rotation 9. The information carriers 7 are magnetic hard discs which are arranged around the support 5 in mutually parallel positions perpendicular to the axis of rotation 9. The housing 3 further accommodates a scanning unit 11 comprising a number of magnetic heads 13 which are mounted on an arm 15 which is pivotable about a pivot axis 17 extending parallel to the axis of rotation 9. The scanning unit 11 comprises a separate magnetic head 13 for each information carrier 7, only one of the magnetic heads 13 being visible in FIG. 1. The information carriers 7 are read or written by the magnetic heads 13 in that the support 5 carrying the information carriers 7 is rotated about the axis of rotation 9 in a rotational direction R and the magnetic heads 13 are positioned relative to the rotating information carriers 7 by pivoting the arm 15 in pivotal directions P and P'.

Figure 3:
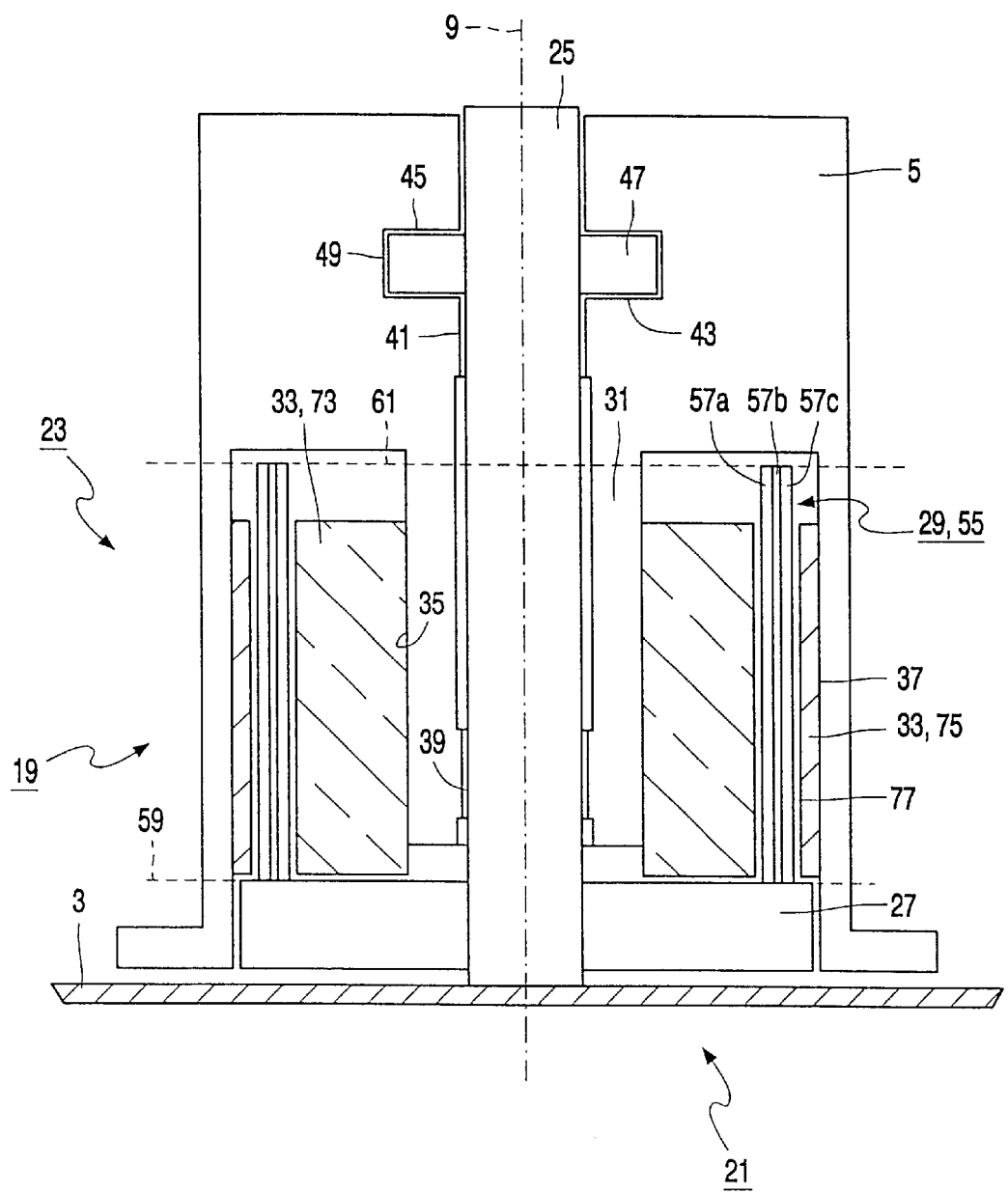
FIG. 3 is a diagrammatic cross-section of an electric motor in accordance with the invention used in the data storage unit of FIG. 1, FIG. 4 diagrammatically shows a foil-shaped insulating substrate carrying a coil system of the electric motor of FIG. 3.

The support 5 of the data storage unit 1 is rotatable about the axis of rotation 9 by means of an electric motor 19 in accordance with the invention, which is diagrammatically shown in FIG. 3. The motor 19 comprises a first part 21, which is mounted in a fixed position relative to the housing 3 of the data storage unit 1, and a second part 23, which is rotatable with respect to the first part 21 about the axis of rotation 9 and to which the support 5 of the data storage unit 1 is mounted. The first part 21 of the motor 19 comprises a central shaft 25, which has a central axis coinciding with the axis of rotation 9 and which is mounted to the housing 3, an annular carrier 27, which is mounted to the shaft 25 and extends perpendicularly to the axis of rotation 9, and a circular-cylindrical stator body 29, which is mounted to the carrier 27 and is concentric relative to the axis of rotation 9. The second part 23 of the motor 19 comprises a sleeve 31, which is concentric relative to the axis of rotation 9, and a circular-cylindrical rotor body 33, which is also concentric relative to the axis of rotation 9 and is partially mounted on an outer wall 35 of the sleeve 31 and partially on an inner wall 37 of the support 5. The first part 21 and the second part 23 of the motor 19 are journalled relative to each other by means of two radial dynamic groove bearings 39 and 41, which are arranged at a distance from each other, seen in a direction parallel to the axis of rotation 9, and which are provided on the central shaft 25 and on the sleeve 31, and by means of two axial dynamic groove bearings 43 and 45, which are provided on an annular thrust plate 47 mounted to the central shaft 25 and on an annular recess 49 provided in the sleeve 31. The groove bearings 39, 41, 43, 45 are of a kind which is generally known.

The circular-cylindrical stator body 29 comprises a foil-shaped insulating substrate 51 on which a three-phase electric coil system 53 is provided. The substrate 51 is bent or rolled up so as to form a circular-cylindrical body 55 comprising three layers 57a, 57b, 57c of the substrate 51 and extending, seen in a direction parallel to the axis of rotation 9, between a first imaginary end surface 59 and a second imaginary end surface 61 both extending perpendicularly to the axis of rotation 9, said body 55 being mounted on the carrier 27 near said first end surface 59. The insulating substrate 51 comprising the coil system 53 is shown in an unrolled condition in FIG. 4. The substrate 51 comprises a first side 63 facing the axis of rotation 9 in a rolled-up condition and a second side 65 which is remote from the axis of rotation 9 in a rolled-up condition. On both sides 63, 65 of the substrate 51, three groups of series-connected spiral-shaped patterns of copper conductor tracks are provided on the substrate 51 by means of an etching process. In the embodiment shown, the first or inner layer 57a of the substrate 51 comprises a first group 67 of patterns 67a–67f on the first side 63 and a second group 67' of patterns 67'a–67'f on the second side 65, wherein the pattern 67a is electrically connected to the pattern 67'a, the pattern 67'a is electrically connected to the pattern 67'b, the pattern 67'b is electrically connected to the pattern 67b, etc. Thus, the patterns 67a–67f and 67'a–67'f are series-connected and form a first phase of the three-phase coil system 53. Likewise, the second or middle layer 57b of the substrate 51 comprises a third group 69 of patterns 69a–69f on the first side 63 and a fourth group 69' of patterns 69'a–69'f on the second side 65, wherein the pattern 69a is electrically connected to the pattern 69'a, the pattern 69'a is electrically connected to the pattern 69'b, the pattern 69'b is electrically connected to the pattern 69b, etc. Thus, the patterns 69a–69f and 69'a–69'f are series connected and form a second phase of the three-phase coil system 53. Finally, the third or outer layer 57c of the substrate 51 comprises a fifth group 71 of patterns 71a–71f on the first side 63 and a sixth group 71' of patterns 71'a–71'f on the second side 65, wherein the pattern 71a is electrically connected to the pattern 71'a, the pattern 71'a is electrically connected to the pattern 71'b, the pattern 71'b is electrically connected to the pattern 71b, etc. Thus, the patterns 71a–71f and 71'a–71'f are series-connected and form a third phase of the three-phase coil system 53. Between the first, the third and the fifth group 67, 69, 71 and between the second, the fourth, and the sixth group 67', 69', 71', a distance d is present on the substrate 51 which is approximately equal to ⅔ times the pitch p between the individual patterns of the groups 67, 67', 69, 69', 71, 71'. As shown in FIG. 3, the circular-cylindrical rotor body 33 comprises a circular-cylindrical magnet body 73 which is mounted on the outer wall 35 of the sleeve 31 and which comprises a number of magnetic poles which successively have opposite radial directions of magnetization, the number of magnetic poles being adapted to the number of patterns of an individual group 67, 67', 69, 69', 71, 71'. The rotor body 33 further comprises a circular-cylindrical closing yoke 75 which is mounted on the inner wall 37 of the support 5. Between the magnet body 73 and the closing yoke 75, a circular-cylindrical gap 77 is present in which the stator body 29 is accommodated, so that the magnet body 73 generates a magnetic field at the location of the conductor tracks on the substrate 51.

Figure 4:
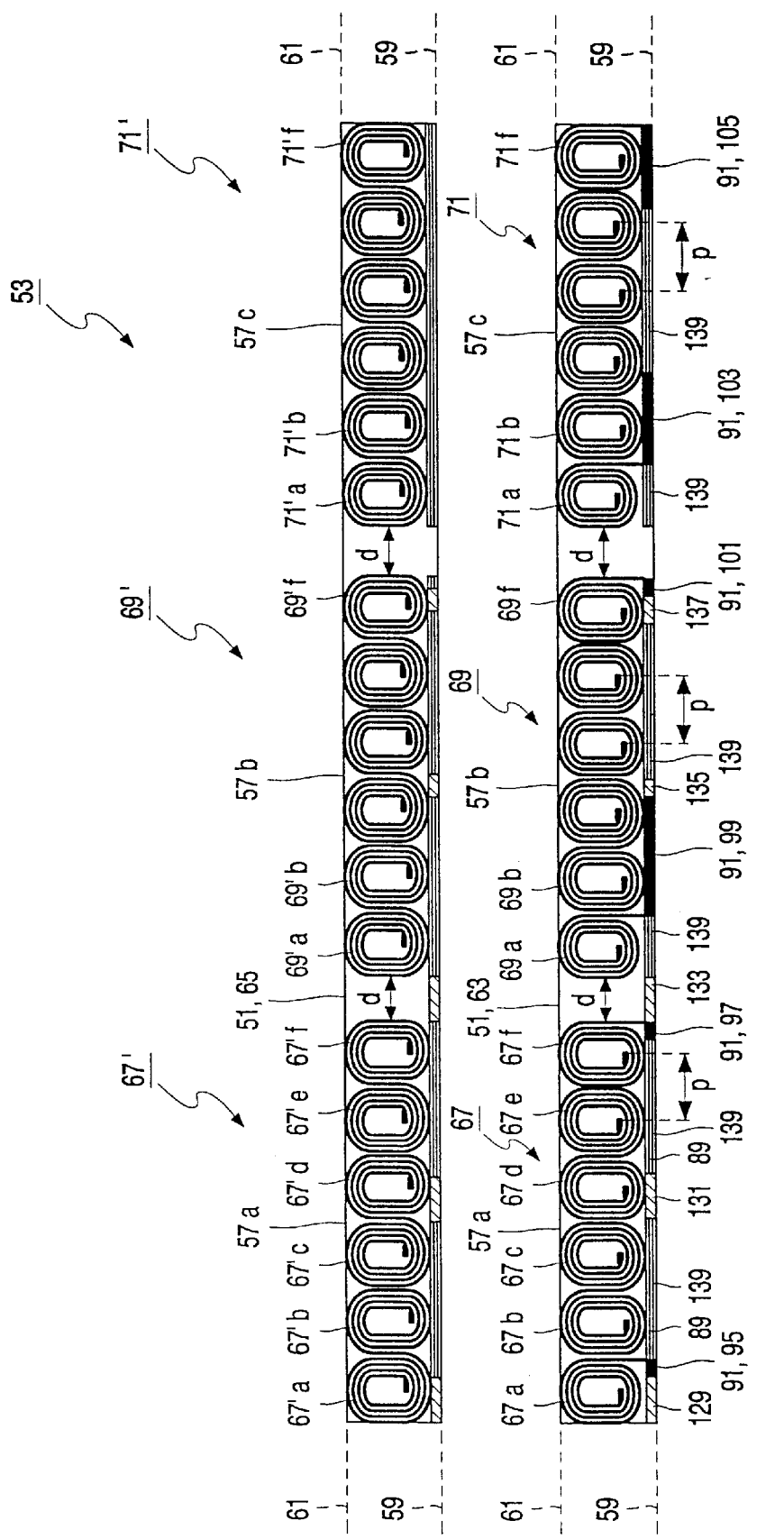
Figure 5:
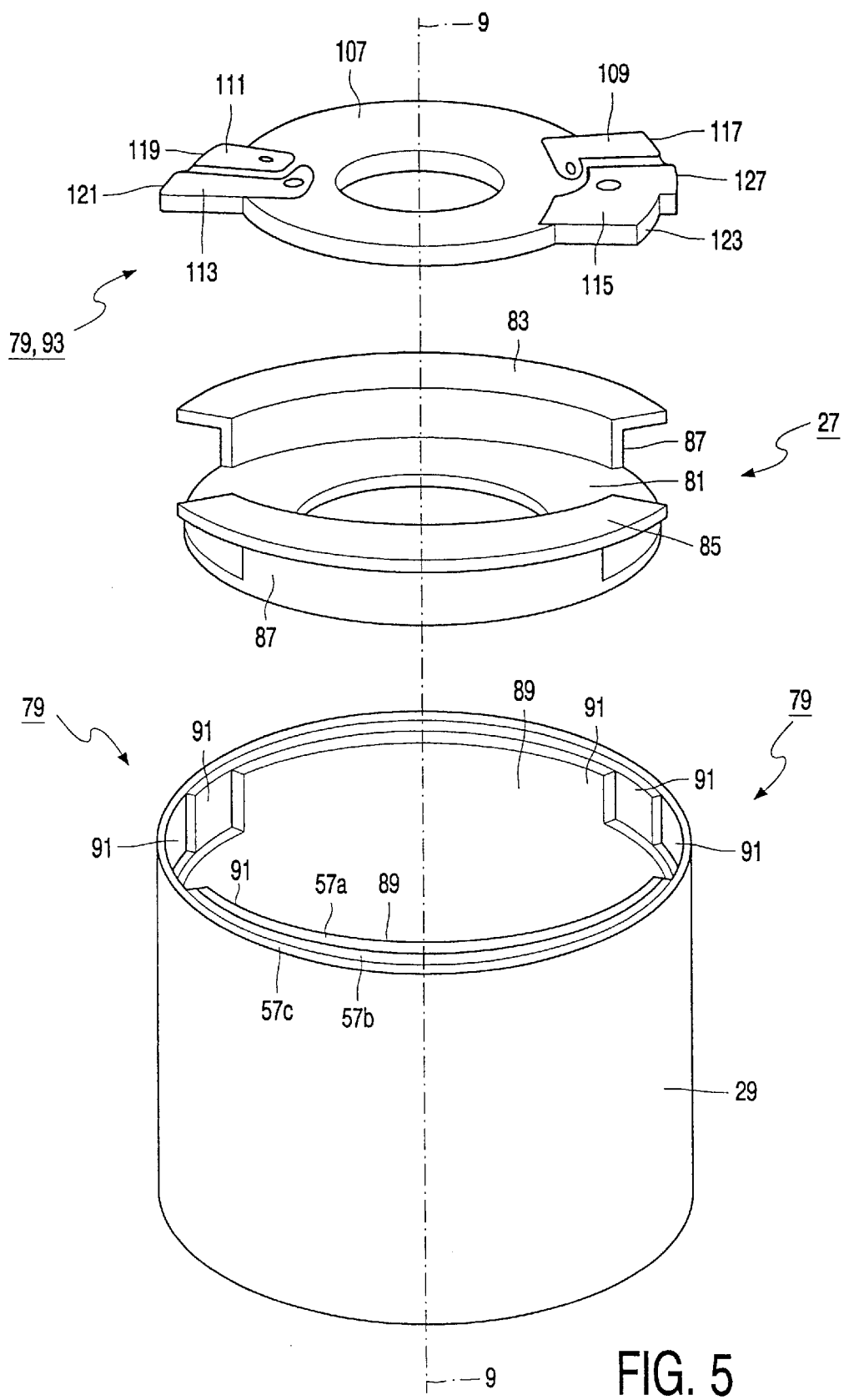
FIG. 5 shows a connector means of the electric motor of FIG. 3.
Figure 6:
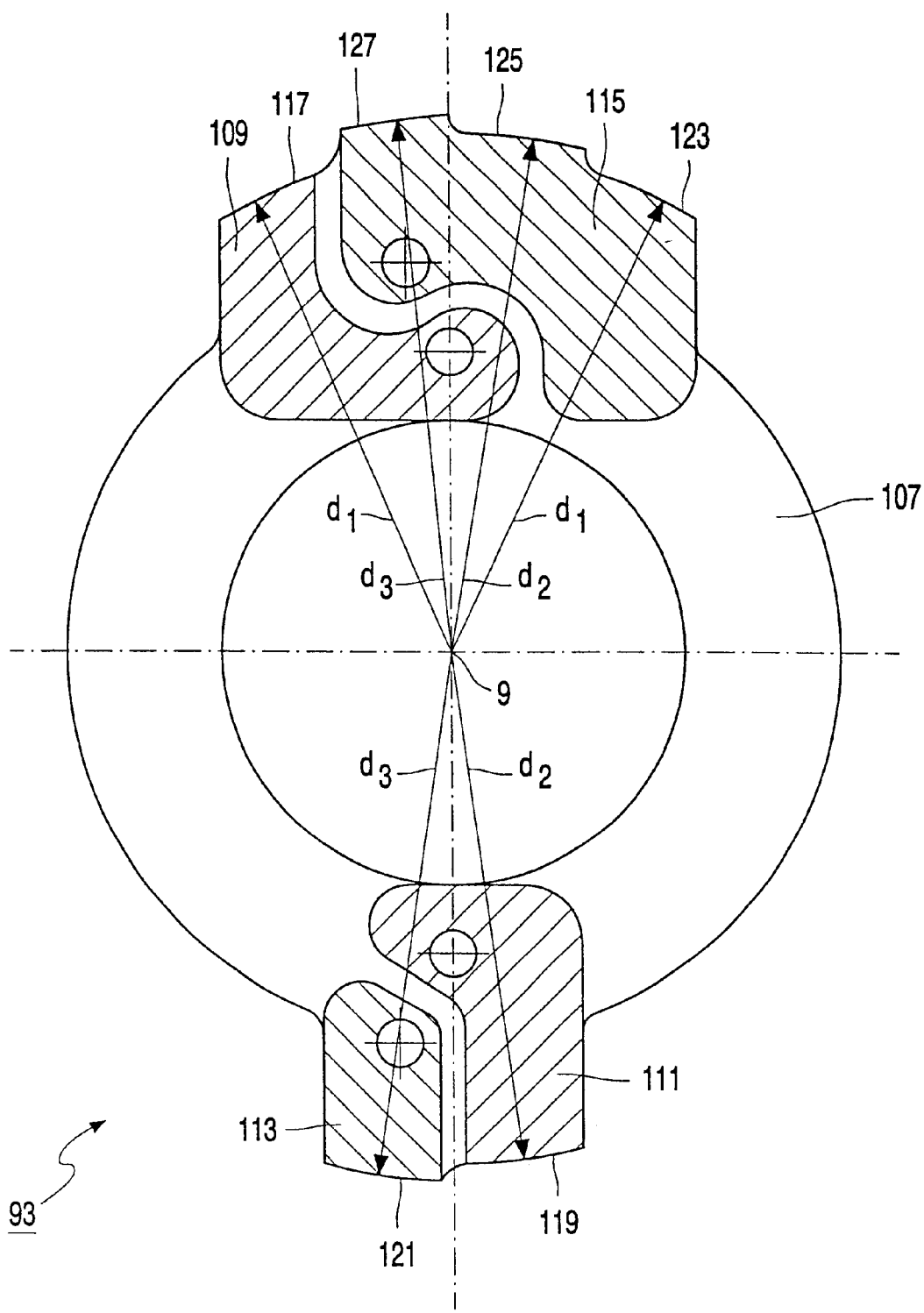
FIG. 6 shows a connector element of the connector means of FIG. 5.

The conductor tracks of the three-phase coil system 53 are connected to an electrical energy source, not shown in the Figs., by means of a connector means 79 of the first part 21 of the motor 19 shown in FIG. 5. FIG. 5 further shows the carrier 27 and the stator body 29 with the substrate 51 in a rolled-up condition. The carrier 27 comprises an annular carrier plate 81 and two curved flanges 83, 85, which are arranged in diametrically opposite positions on the carrier plate 81 and have outer surfaces 87. In an assembled condition of the first part 21 of the motor 19, the stator body 29 is fixed to the carrier 27 by means of an adhesive which is provided between the outer surfaces 87 of the flanges 83, 85 and mounting areas 89 on the first side 63 of the inner layer 57a of the stator body 29. Said mounting areas 89 are also shown in FIG. 4. The connector means 79 comprise first connector elements 91, which are shown in FIGS. 4 and 5 and are provided on the first side 63 of the substrate 51, and a second connector element 93, which is shown in FIG. 5 and is mounted on the carrier plate 81. As shown in FIG. 4, the first connector elements 91 each comprise an additional conductor track which extends near and substantially parallel to the first end surface 59. More specifically, the series-connected patterns of conductor tracks of the first group 67 and the second group 67' comprise a first additional conductor track 95, which is electrically connected to the first winding of the pattern 67a, and a second additional conductor track 97, which is electrically connected to the last winding of the pattern 67f. Likewise, the series connected patterns of conductor tracks of the third group 69 and the fourth group 69' comprise a third additional conductor track 99, which is electrically connected to the first winding of the pattern 69a, and a fourth additional conductor track 101, which is electrically connected to the last winding of the pattern 69f. Finally, the series-connected patterns of conductor tracks of the fifth group 71 and the sixth group 71' comprise a fifth additional conductor track 103, which is electrically connected to the first winding of the pattern 71a, and a sixth additional conductor track 105, which is electrically connected to the last winding of the pattern 71f. As shown in FIGS. 5 and 6, the second connector element 93 comprises an annular carrier plate 107 which is fixed to the carrier plate 81 of the carrier 27 in an assembled condition of the first part 21 of the motor 19. On the carrier plate 107, four copper connector pieces 109, 111, 113, 115 are provided, the connector pieces 109, 111, 113 being electrically connected to the respective three phases of said energy source, and the connector piece 115 being electrically connected to the ground contact of said energy source in a manner not shown in the Figs. The connector pieces 109, 111, 113 respectively have outer contact surfaces 117, 119, 121 which are present at respectively radial distances $d_1$, $d_2$, and $d_3$ from the axis of rotation 9, said distances $d_1$, $d_2$, $d_3$ substantially corresponding to the distances between the axis of rotation 9 and the first side 63 of the first layer 57a, the second layer 57b, and the third layer 57c of the rotor body 29, respectively. The connector piece 115 has three separate contact surfaces 123, 125, 127 which are likewise present at on the radial distances $d_1$, $d_2$, and $d_3$ respectively.

As FIG. 4 shows, the additional conductor tracks 95, 97, 99, 101, 103, 105, which constitute said first connector elements 91 of the connector means 79, are provided on the substrate 51 in positions between the first imaginary end surface 59 and the second imaginary end surface 61. In this manner, the first connector elements 91 do not protrude from the substrate 51. As a result of their presence on the substrate 51, i.e. between the first and the second end surfaces 59 and 61, the first connector elements 91 are protected against damage which could be caused by inaccurate handling forces on and movements of the substrate 51 or the stator body 29 during the manufacturing process of the electric motor 19. Likewise, the connector pieces 109, 111, 113, 115 of the second connector element 93 are effectively protected against such damage as a result of their presence on the carrier plate 107 and the carrier 27. In this way, a very robust construction of the connector means 79 is achieved.

In an assembled condition of the first part 21 of the motor 19, the contact surface 117 of the connector piece 109 is in electrical contact with the additional conductor track 97 on the inner layer 57a of the substrate 51, and the contact surface 123 of the connector piece 115 is in electrical contact with the additional conductor track 95 on the inner layer 57a of the substrate 51. Furthermore, the contact surface 119 of the connector piece 111 is in electrical contact with the additional conductor track 99 on the middle layer 57b, and the contact surface 125 of the connector piece 115 is in electrical contact with the additional conductor track 101 on the middle layer 57b. The inner layer 57a of the substrate 51, which is present between the middle layer 57b and the connector pieces 111, 115 connected to the middle layer 57b, is provided near the first end surface 59 with a first elongated opening 129, through which the contact surface 125 of the connector piece 115 extends, and with a second elongated opening 131, through which the contact surface 119 of the connector piece 111 extends, said openings 129 and 131, which are visible in FIG. 4, partially overlapping the additional conductor tracks 101 and 99, respectively, in the rolled-up condition of the substrate 51. The contact surface 125 of the connector piece 115 further extends through a first elongated opening 133 which is provided in the middle layer 57b of the substrate 51 near the first end surface 59. Finally, the contact surface 121 of the connector piece 113 is in electrical contact with the additional conductor track 103 on the outer layer 57c, and the contact surface 127 connector piece 115 is in electrical contact with the additional conductor track 105 on the outer layer 57c. The middle layer 57b of the substrate 51, which is present between the outer layer 57c and the connector pieces 113, 115 connected to the outer layer 57c, is provided near the first end surface 59 with a second opening 135, through which the contact surface 121 of the connector piece 113 extends, and with a third opening 137, through which the contact surface 127 of the of the connector piece 115 extends, said openings 135, 137, which are also visible in FIG. 4, partially overlapping the additional conductor tracks 103 and 105, respectively, in the rolled-up condition of the substrate 51. The contact surface 121 of the connector piece 113 further extends through the second elongated opening 131 in the inner layer 57a, which is present between the outer layer 57c and the connector piece 113 in addition to the middle layer 57b, and the contact surface 127 of the connector piece 113 further extends through the first elongated opening 129 in the inner layer 57a and the first elongated opening 133 in the middle layer 57b. The connector pieces 109, 111, 113, 115 can be in pressure contact with the first connector elements 91. Alternatively, the connector pieces 109, 111, 113, 115 can be connected to the first connector elements 91 by means of, for example, soldered joints.

Since the first connector elements 91 each comprise an additional conductor track 95, 97, 99, 101, 103, 105, the manufacturing process of the electric motor 19 is simplified, because the additional conductor tracks 95, 97, 99, 101, 103, 105 can be provided on the substrate 51 in a similar manner and simultaneously with the patterns 67, 67', 69, 69', 71, 71' of the conductor tracks. Besides, the additional conductor tracks 95, 97, 99, 101, 103, 105 are substantially not susceptible to damage resulting from inaccurate handling forces and movements during the manufacturing process of the electric motor 19. Since the additional conductor tracks 95, 97, 99, 101, 103, 105 extend substantially parallel to the first end surface 59, a great freedom of design is achieved, because the length of the additional conductor tracks 95, 97, 99, 101, 103, 105 can be adapted to the desired position of the connector pieces 109, 111, 113, 115 on the carrier plate 107 and the carrier 27.

As FIG. 4 shows, the additional conductor tracks 95, 97, 99, 101, 103, 105 on the substrate 51 each constitute a part of a metal track 139, which extends near the first end surface 59, substantially parallel to the first end surface 59, and substantially over the complete length of the substrate 51, the additional conductor tracks 95, 97, 99, 101, 103, 105 being electrically disconnected from the metal track 139 by suitable interruptions in the metal track 139. As a result of the presence of said metal track 139, a substantially uniform bending stiffness of the substrate 51 is achieved over the complete length of the substrate 51. As a result of said uniform bending stiffness, the circular-cylindrical stator body 29 of the first part 21 of the motor 19, which is formed by bending said substrate 51, has an accurate cylindrical roundness relative to the axis of rotation 9.

The electric motor 19 in accordance with the invention as described before is used in the data storage unit 1 in accordance with the invention as described before. It is noted that an electric motor in accordance with the invention can also be used in other devices wherein a part of the device has to be rotated about an axis of rotation. An electric motor in accordance with the invention can, for example, also be used in a data storage unit for an optical information carrier or in a scanning device comprising a rotatable multifaceted mirror.

It is further noted that the invention also covers electric motors in which the circular-cylindrical body of the first part comprises another number of layers of the foil-shaped insulating substrate. Thus, for example, the circular-cylindrical body may also comprise only one or two, or more than three layers of the substrate. In such alternative embodiments, each layer of the substrate may comprise a single electrical phase of the coil system provided on the substrate. However, the invention also covers embodiments in which each single phase of the coil system is provided on more than one layer of the substrate, or in which a layer of the substrate comprises more than one phase of the coil system. In embodiments, in which the circular-cylindrical body only comprises two layers of the substrate, openings in the substrate as described before can be avoided if the connector pieces of the second connector element, which one used to make contact with the inner layer, are provided inside the circular-cylindrical body, as in the embodiment described before, and the connector pieces of the second connector element, which one used to make contact with the outer layer, are provided outside said body. However, in embodiments having three or more layers of the substrate, the connector pieces of the second connector element may also be provided both inside and outside the circular-cylindrical body in order to reduce the necessary number of openings in the substrate.

It is finally noted that the invention also covers embodiments in which the first connector element and/or the second connector element are formed in an alternative manner. Instead of a number of additional conductor tracks, the first connector element may, for example, comprise a number of metal pins which are provided on the substrate between the first and the second end surfaces.

What is claimed is:

1. An electric motor comprising a first part and a second part which are rotatable with respect to each other about an axis of rotation, wherein the first part comprises a foil-shaped insulating substrate, on which a plurality of series-connected spiral-shaped patterns of conductor tracks are provided and which is bent as a circular-cylindrical body extending, seen in a direction parallel to the axis of rotation, between a first and a second imaginary end surface and being mounted on a carrier near the first end surface, and wherein the second part comprises a permanent magnet unit for generating a magnetic field at the location of the conductor tracks, said first part being provided with connector means for connecting said conductor tracks to an electrical energy source, characterized in that said connector means comprise a first connector element, which is provided on the substrate between the first and the second end surface near the first end surface and is electrically connected to the conductor tracks, and a second connector element, which is provided on the carrier and is electrically connected to the first connector element.

2. An electric motor as claimed in claim 1, characterized in that the first connector element comprises an additional conductor track.

3. An electric motor as claimed in claim 2, characterized in that the additional conductor track extends substantially parallel to the first end surface.

4. An electric motor as claimed in claim 3, characterized in that the substrate is provided with a metal track extending near the first end surface, substantially parallel to the first end surface, and substantially over the complete length of the substrate, wherein part of said metal track constitutes the additional conductor track.

5. An electric motor as claimed in claim 1, characterized in that the circular-cylindrical body comprises at least two substrate layers, wherein each layer, which is present between another layer and a connector element on the carrier connected to the other layer, is provided with an opening in the substrate through which said connector element extends.

6. A data storage unit comprising a support for at least one information carrier, an electric motor for rotating the support about an axis of rotation, and a scanning unit for scanning the information carrier, characterizes in that the electric motor is an electric motor as claimed in claim 1.

* * * * *